United States Patent
Oveyssi et al.

(10) Patent No.: US 6,529,351 B1
(45) Date of Patent: Mar. 4, 2003

(54) DISK DRIVE COMPRISING A VOICE COIL MOTOR HAVING A YOKE WITH A MULTIPLE-BEND MAGNETIC FLUX CONDUCTOR

(75) Inventors: Kamran Oveyssi, San Jose, CA (US); Mitchell D. Dougherty, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 159 days.

(21) Appl. No.: 09/775,161

(22) Filed: Jan. 31, 2001

(51) Int. Cl.$^7$ ................................................ G11B 21/08
(52) U.S. Cl. ................................................... 360/264.8
(58) Field of Search ............................. 360/264.1–264.8

(56) References Cited

U.S. PATENT DOCUMENTS

| | | |
|---|---|---|
| 4,658,313 A | 4/1987 | Takahashi et al. |
| 5,233,493 A * | 8/1993 | Eliason |
| 5,448,437 A * | 9/1995 | Katahara |
| 5,523,911 A | 6/1996 | Mita et al. |
| 5,557,152 A | 9/1996 | Gauthier |
| 5,600,517 A * | 2/1997 | Whitmore |
| 5,808,838 A | 9/1998 | Battu et al. |
| 5,818,667 A | 10/1998 | Larson |
| 5,822,156 A | 10/1998 | Suzuki et al. |
| 5,847,903 A * | 12/1998 | Ogawa et al. |
| 5,914,836 A | 6/1999 | Pottebaum |
| 5,953,183 A | 9/1999 | Butler et al. |
| 6,157,099 A | 12/2000 | Hartman |
| 6,252,744 B1 * | 6/2001 | Kelemen .................. 360/264.9 |
| 6,421,208 B1 * | 7/2002 | Oveyssi .................... 360/264.8 |

* cited by examiner

*Primary Examiner*—Allen Cao
(74) *Attorney, Agent, or Firm*—W. Chris Kim, Esq.; Milad G. Shara, Esq.; Howard H. Sheerlin, Esq.

(57) ABSTRACT

A disk drive is disclosed comprising an actuator arm, a head coupled to the actuator arm, and a voice coil motor for actuating the actuator arm to move the head. The voice coil motor comprises a first magnet for generating a first magnetic flux, and a yoke comprising a magnetic flux conductor for guiding the first magnetic flux. The magnetic flux conductor comprises a body and a top and bottom protruding plate portions, wherein the body and the plate portions are integrally formed. The body defines, in vertical cross section, a primary bend having a primary bend radius and at least one secondary bend having a secondary bend radius.

20 Claims, 5 Drawing Sheets

DISK DRIVE COMPRISING A VOICE COIL MOTOR HAVING A YOKE WITH A MULTIPLE-BEND MAGNETIC FLUX CONDUCTOR

CROSS REFERENCE TO RELATED APPLICATIONS AND PATENTS

This application is related to other U.S. patent applications, namely Ser. No. 09/584,652, U.S. Pat. No. 6,421,208 B1 entitled "DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX" filed on May 30, 2000, and Ser. No. 09/704,188, U.S. Pat. No. 6,462,914 entitled "VOICE COIL MOTOR COMPRISING A VOICE COIL WRAPPED AROUND A ROTARY VOICE COIL YOKE COMPRISING A LOW RELUCTANCE END AND A HIGH RELUCTANCE END" filed on Oct. 31, 2000. The disclosures of the above-referenced patent applications are incorporated herein by reference.

BACKGROUND OF THE INVENTION

1. Field of the Invention

The present invention relates to disk drives for computer systems. More particularly, the present invention relates to a disk drive comprising a voice coil motor having a yoke with a multiple-bend magnetic flux conductor.

2. Description of the Prior Art

Computer systems typically comprise a disk drive comprising one or more disks rotated about a center axis by a spindle motor, and a head coupled to the distal end of an actuator arm which is actuated radially over the surface of the disk by a voice coil motor. The surface of the disk is coated with a magnetic material which is magnetized by the head in order to record digital data on the disk. The digital data modulates a current in a write coil of the head in order to write magnetic transitions representing the recorded data in concentric, radially spaced tracks. During read back, the head senses the magnetic transitions to generate an analog read signal comprising pulses representing the recorded digital data, wherein the pulses are demodulated into digital data transmitted to the host computer system.

Prior art voice coil motors typically employ a yoke comprised of a top and bottom trapezoidal plates for housing top and bottom trapezoidal magnets for generating a first magnetic flux guided through the plates and through an air gap between the magnets. A trapezoidal voice coil is inserted into the air gap and a current applied to the voice coil generates a second magnetic flux interacting orthogonally with the first magnetic flux. The orthogonal interaction of the magnetic fluxes creates a torque which rotates the actuator arm about a pivot so as to position the head radially over the disk.

The two plate, two magnetic prior art voice coil motors are expensive to manufacture and install into the disk drive. The top and bottom magnets are typically manufactured with a center polarity boundary to generate the first magnetic flux bi-directionally (up and down), wherein the "up" magnetic flux interacts with a first side of the trapezoidal voice coil, and the "down" magnetic flux interacts with a second side of the trapezoidal voice coil. Magnetizing the magnets with the appropriate polarity boundary increases the expense of the magnets. In addition, generating the bi-directional flux requires a magnet of sufficient size, which further increases the manufacturing cost of the voice coil motor. Still further, installing the trapezoidal plates requires a three step process: connecting the bottom plate to the base of the disk drive, installing the voice coil and actuator arm onto a pivot, and connecting the top plate to the bottom plate forming the air gap between the magnets. This three step process increases the manufacturing time and expense of the disk drive.

The above-referenced patent application entitled "DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX" discloses a voice coil motor employing a yoke comprising a unitary U-shaped magnetic flux conductor comprising top and bottom magnets for generating a unidirectional magnetic flux. The unidirectional magnetic flux interacts with only one side of a trapezoidal voice coil wherein the second side of the voice coil acts only as a return path for the current. This reduces the manufacturing expense of the voice coil motor since it obviates the need to magnetize the magnets with a center polarity boundary. Further, the amount of magnetic material is reduced to essentially half that of the conventional trapezoidal two plate design described above. Still further, installing the voice coil motor involves a less expensive and less time consuming two step process: connecting the U-shaped magnetic flux conductor to the base of the disk drive, and installing the voice coil and actuator arm onto a pivot and rotating the trapezoidal voice coil into the air gap between the magnets.

FIG. 1A shows a top, perspective view of a U-shaped magnetic flux conductor 2 employed in the above-referenced patent application. As shown in the side view of FIG. 1B, the U-shaped magnetic flux conductor 2 comprises a body having a top protruding plate portion 4A and a bottom protruding plate portion 4B. A magnet 6 is attached to an interior surface of the top plate portion 4A for generating the unidirectional magnetic flux 8 conducted through the U-shaped magnetic flux conductor 2 and through an air gap 10 formed between the magnet 6 and the second protruding plate portion 4B. A first side of a trapezoidal voice coil interacts with the unidirectional magnetic flux 8 to generate the torque for rotating the actuator arm about the pivot, and a second side of the trapezoidal coil acts as a return path for the current.

Since air has a high reluctance, it is desirable to bend the U-shaped magnetic flux conductor 2 into a small radius so as to minimize the width of the air gap 10, thereby enhancing performance of the voice coil motor. In addition, it is desirable to manufacture the U-shaped magnetic flux conductor 2 with sufficient thickness so as to prevent the magnetic flux 8 from saturating the magnetic flux conductor 2. However, the thickness of the magnetic flux conductor 2 limits the bend radius before cracks 12 will manifest about the bend as illustrated as dashed lines in FIG. 1B. Thus, the thickness of the magnetic flux conductor 2 and relative strength of the magnet 6 limits the minimum width of the air gap 10.

There is, therefore, a need to reduce the air gap in a voice coil motor employing a yoke manufactured by bending a magnetic flux conductor to form an air gap without cracking the magnetic flux conductor about the bend.

SUMMARY OF THE INVENTION

The present invention may be regarded as a disk drive comprising an actuator arm, a head coupled to the actuator arm, and a voice coil motor for actuating the actuator arm to move the head. The voice coil motor comprises a first magnet for generating a first magnetic flux, and a yoke comprising a magnetic flux conductor for guiding the first magnetic flux. The magnetic flux conductor comprising a body and a top and bottom protruding plate portions, wherein the body and the plate portions are integrally formed. Each plate portion extends away from the body, and the top plate portion is vertically spaced-apart from the bottom plate portion. The body defines, in vertical cross section, a primary bend having a primary bend radius and at least one secondary bend having a secondary bend radius, wherein the secondary bend radius is non-concentric with the primary bend radius. The voice coil motor further comprises a voice coil for conducting a current to generate a second magnetic flux for interacting at least partially with the first magnetic flux.

In one embodiment, the magnetic flux conductor comprises a substantially U-shape. In another embodiment, the secondary bend comprises a plurality of contiguous secondary bends, and in another embodiment the secondary bend comprises a plurality of non-contiguous secondary bends. In yet another embodiment, the voice coil motor further comprises a second magnet attached to the top plate portion of the magnetic flux conductor, and the first magnet is attached to the bottom plate portion of the magnetic flux conductor. In one embodiment, the voice coil comprises a trapezoidal shape comprising a first side and a second side, the first side for conducting the current to generate at least part of the second magnetic flux for interacting with the first magnetic flux, and the second side for returning the current to the first side and for generating at least part of the second magnetic flux not substantially interacting with any magnetic flux. In an alternative embodiment, the voice coil is wrapped around the top plate portion of the magnetic flux conductor.

The present invention may also be regarded as a yoke for use in a voice coil motor of a disk drive, the disk drive comprising an actuator arm and a head coupled to the actuator arm. The voice coil motor comprises a first magnet for generating a first magnetic flux, and the yoke comprises a magnetic flux conductor for guiding the first magnetic flux. The magnetic flux conductor comprising a body and a top and bottom protruding plate portions, wherein the body and the plate portions are integrally formed. Each plate portion extends away from the body, and the top plate portion is vertically spaced-apart from the bottom plate portion. The body defines, in vertical cross section, a primary bend having a primary bend radius and at least one secondary bend having a secondary bend radius, wherein the secondary bend radius is non-concentric with the primary bend radius.

DESCRIPTION OF THE PREFERRED EMBODIMENTS

Figure 4:
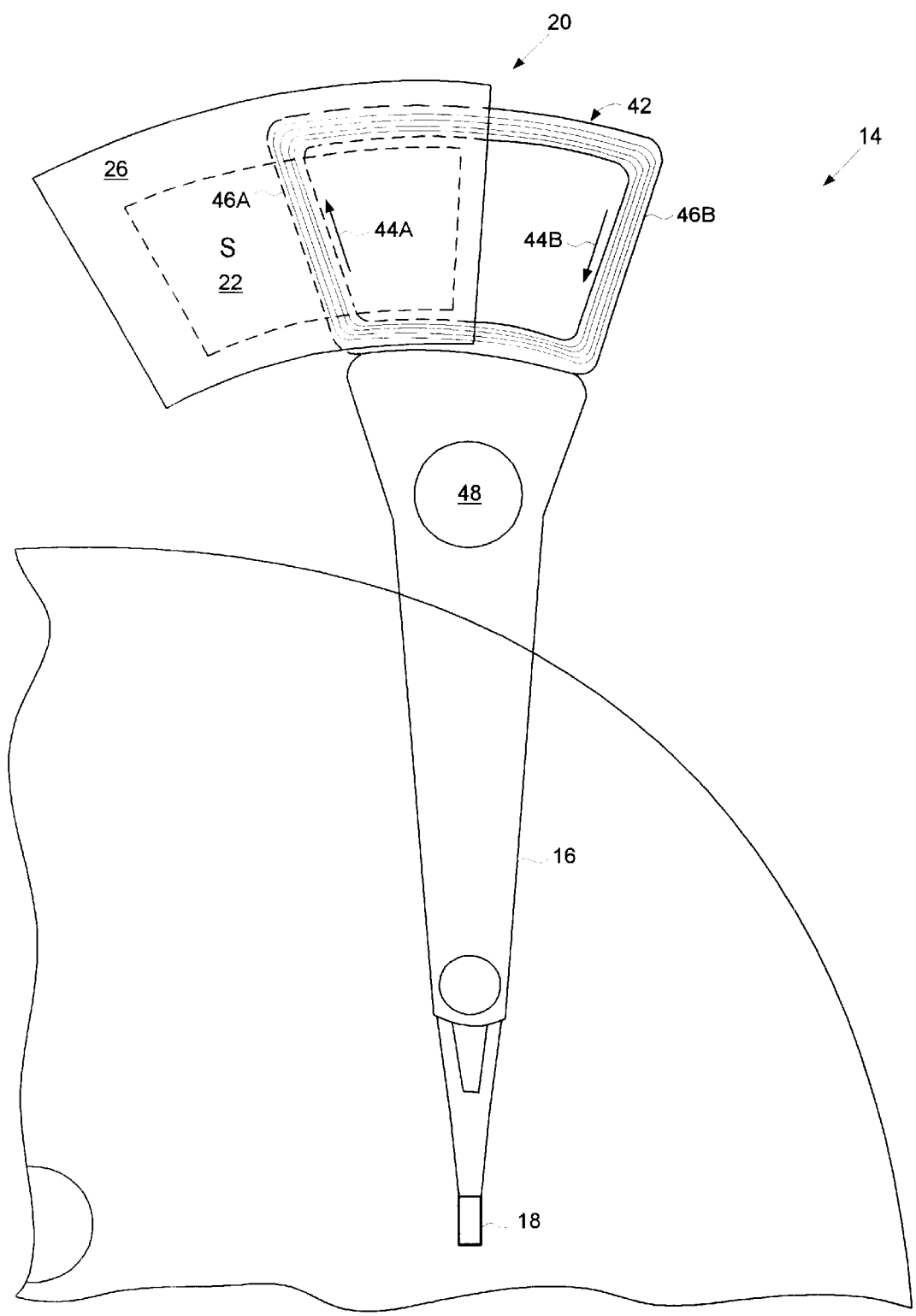
FIG. 4 shows a disk drive according to an embodiment of the present invention wherein the voice coil motor employs a trapezoidal voice coil comprising a first side and a second side, the first side for conducting a current to generate at least part of a second magnetic flux for interacting with a first magnetic flux generated by the magnet attached to the yoke, and the second side for returning the current to the first side and for generating at least part of the second magnetic flux not substantially interacting with any magnetic flux.

FIG. 4 shows a disk drive 14 according to an embodiment of the present invention. The disk drive 14 comprises an actuator arm 16, a head 18 coupled to the actuator arm 16, and a voice coil motor 20 for actuating the actuator arm 16 to move the head 18. The voice coil motor 20 comprises a first magnet 22 for generating a first magnetic flux 24 (FIG. 2B) traversing air gap 32, and a yoke comprising a magnetic flux conductor 26 for guiding the first magnetic flux 24. The magnetic flux conductor 26 comprising a body 28 and a top and bottom protruding plate portions 30A and 30B (FIG. 2A), wherein the body 28 and the plate portions 30A and 30B are integrally formed. Each plate portion 30A and 30B extends away from the body 28, and the top plate portion 30A is vertically spaced-apart from the bottom plate portion 30B. The body 28 defines, in vertical cross section, a primary bend 34 having a primary bend radius 36 and at least one secondary bend 38 having a secondary bend radius 40, wherein the secondary bend radius 40 is non-concentric with the primary bend radius 36. The voice coil motor 20 further comprises a voice coil 42 for conducting a current to generate a second magnetic flux 44A and 44B for interacting at least partially with the first magnetic flux 24.

Figure 2A:
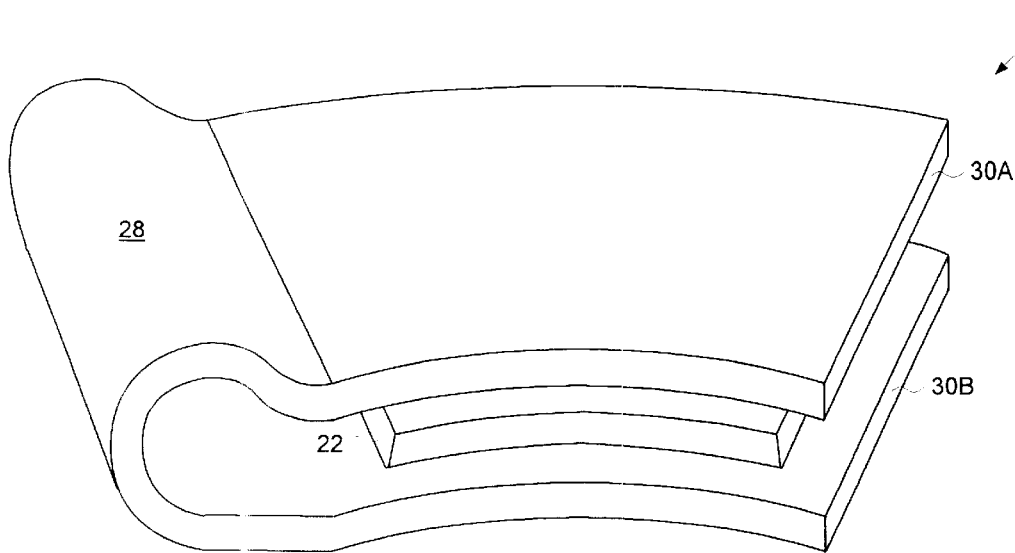
FIG. 2A is a perspective view of a yoke for use in a voice coil motor of a disk drive according to an embodiment of the present invention, wherein the magnetic flux conductor of the yoke comprises a primary bend and at least one secondary bend which reduces the air gap between the top and bottom plates and/or increases the thickness of the magnetic flux conduct while avoiding cracks in the magnetic flux conductor.

The magnetic flux conductor 26 is formed from any suitable material (e.g., steel) which is bent to form the primary bend 34 and secondary bend 38 using a suitable pressing operation. In the embodiment of FIG. 2A, the magnetic flux conductor 26 is bent into a substantially U-shape by bending a flat piece of metal first to form the primary bend 34 and then to form the secondary bend 38. The primary bend radius 36 and secondary bend radius 40 exceed a predetermined threshold to prevent cracking the magnetic flux conductor 26 when bent into shape. The threshold is determined from the characteristics of the magnetic flux conductor 26, particularly the thickness. In one embodiment, the primary bend radius 36 is selected very near the threshold, and the secondary bend radius 40 is selected to be greater or equal to the primary bend radius 36. The physical characteristics of the disk drive, particularly the height, also affect the choice of material for the magnetic flux conductor, the thickness of the conductor and magnet, and the size of air gap. In a standard 3.5 inch disk drive with a one inch height, a suitable magnetic flux conductor 26 made from steel has a thickness of 3 mm, a 3.5 mm bend radius each for the primary and secondary bends, a 1.7 mm magnet, and a 3.5 mm gap between the top plate portion 30A and the bottom plate portion 30B.

The secondary bend 38 reduces the air gap 32 and/or enables the use of a thicker magnetic flux conductor 26 in order to optimize the performance of the voice coil motor 20 without cracking the magnetic flux conductor 26. This is understood by comparing the magnetic flux conductor 2 of FIG. 1B which has the same thickness and size of air gap 10 as the thickness and air gap 32 of the magnetic flux conductor 26 of FIG. 2B. However, because the primary bend radius 36 and secondary bend radius 40 of FIG. 2B are greater than the single bend radius in the prior art magnetic flux conductor 2 of FIG. 1B, the cracking 12 shown in FIG. 1B is avoided.

Figure 2B:
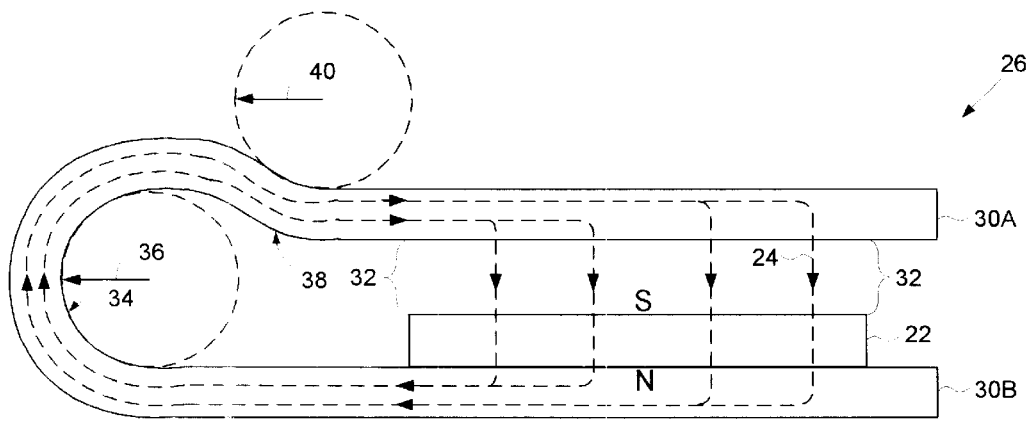
FIG. 2B is a side view of the yoke of FIG. 2A illustrating the non-concentric orientation of the primary and secondary bends, wherein a bend radius of the primary and secondary bends exceed a predetermined threshold which prevents cracking in the magnet flux conductor.
Figure 2C:
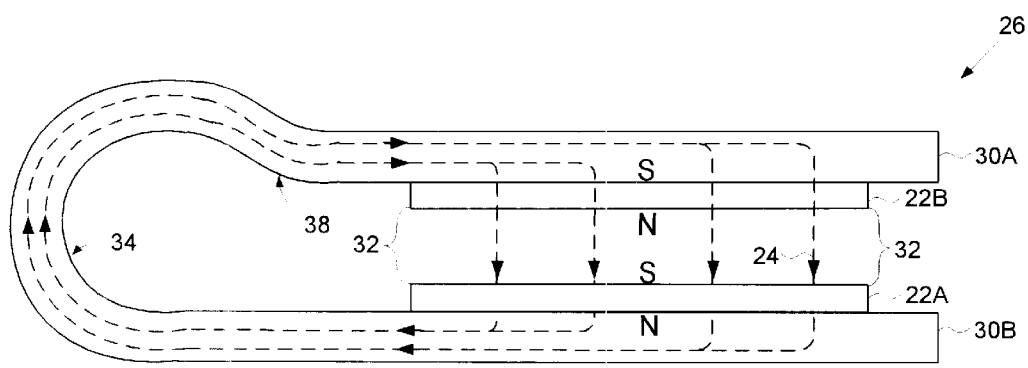
FIG. 2C is a side view of a yoke according to an alternative embodiment of the present invention wherein a first magnet is attached to a bottom plate portion of the magnetic flux conductor, and a second magnet is attached to a top plate portion of the magnetic flux conductor.

In the embodiment of FIGS. 2A and 2B, a single magnet 22 is attached to the bottom plate portion 30B which reduces the manufacturing cost of the voice coil motor 20. FIG. 2C shows an alternative embodiment of the present invention wherein a first magnet 22A is attached to the bottom plate portion 30B, and a second magnet 22B is attached to the top plate portion 30A. The two magnet embodiment more optimally distributes the magnetic flux 24 in the vertical direction within the air gap 32 which helps to attenuate the resonance that can manifest in the single magnet embodiment.

Figure 1A:
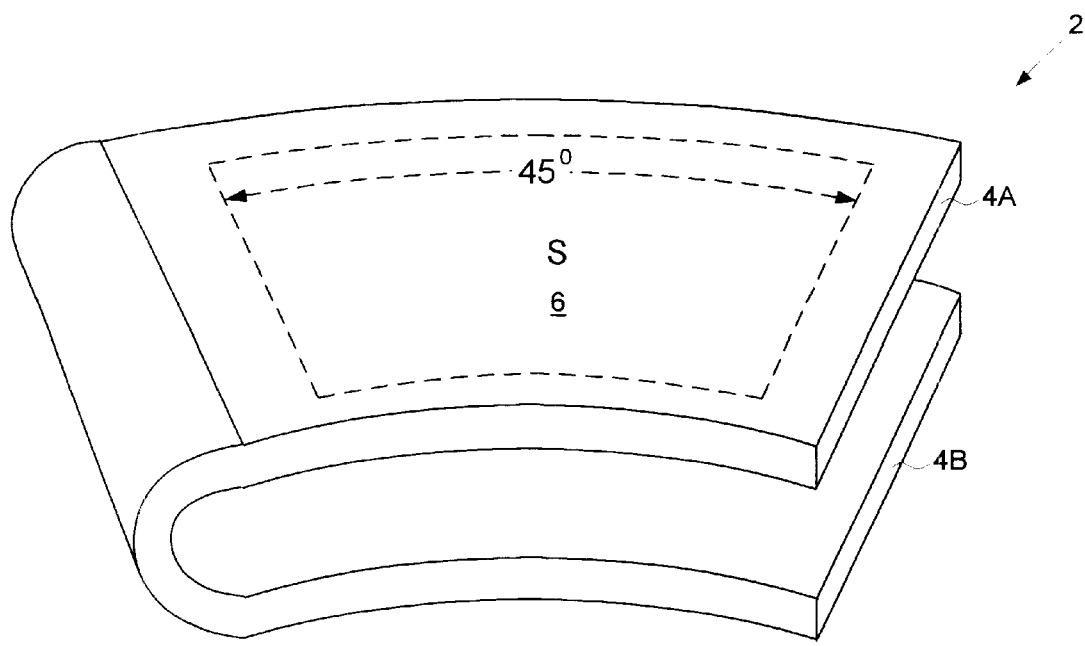
FIG. 1A is a perspective view of a prior art U-shaped yoke for use in a voice coil motor of a disk drive.
Figure 1B:
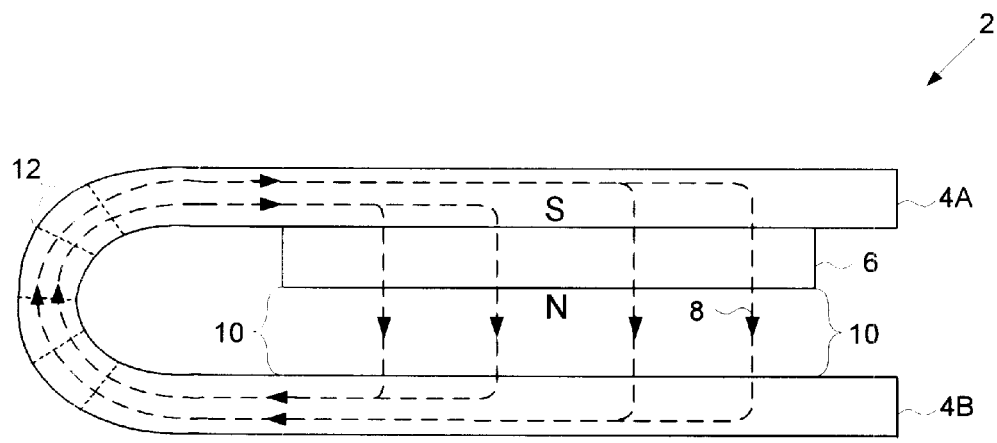
FIG. 1B is a side view of the prior art U-shaped yoke of FIG. 1A, wherein cracks are induced in the magnetic flux conductor of the yoke if the bend radius is too small relative to a thickness of the magnetic flux conductor.
Figure 3A:
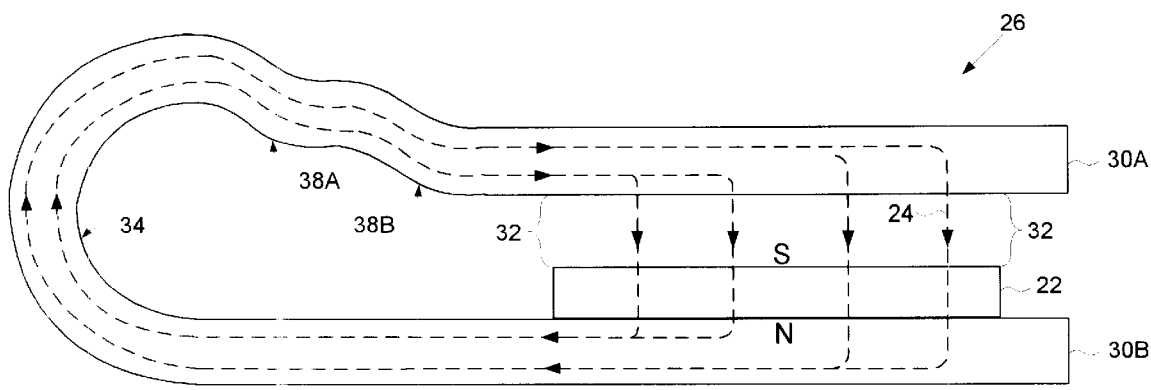
FIG. 3A is a side view of a yoke according to an alternative embodiment of the present invention wherein a plurality of contiguous secondary bends are employed to further reduce the air gap and/or increase the thickness of the magnetic flux conductor.
Figure 3B:
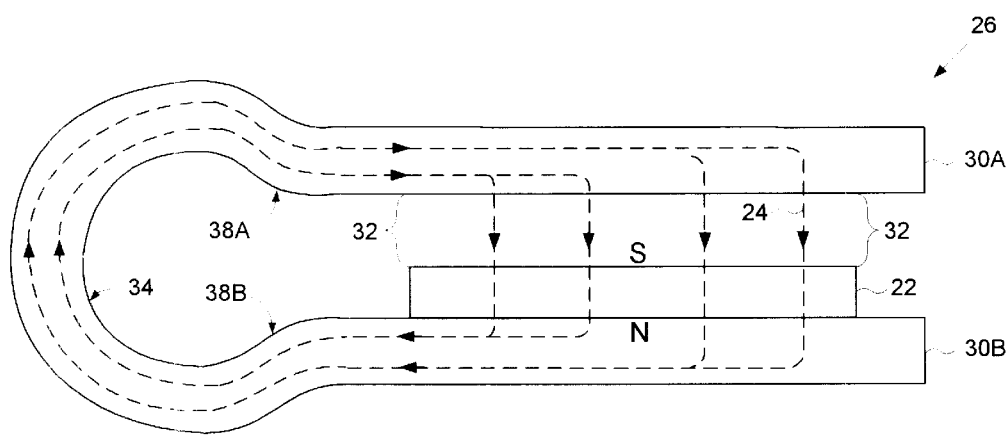
FIG. 3B is a side view of a yoke according to an alternative embodiment of the present invention wherein a plurality of non-contiguous secondary bends are employed to further reduce the air gap and/or increase the thickness of the magnetic flux conductor.

FIG. 3A shows an alternative embodiment of the present invention wherein the magnetic flux conductor 26 comprises a plurality of contiguous secondary bends 38A and 38B which enable the use of an even smaller air gap 32 and/or an even thicker magnetic flux conductor 26 while avoiding the cracking problem 12 of FIG. 1B. The plurality of secondary bends 38A and 38B "step down" the top plate portion 30A toward the bottom plate portion 30B with bend radiuses which do not exceed the cracking threshold. In an alternative embodiment shown in FIG. 3B a plurality of non-contiguous secondary bends 38A and 38B are employed to bring the top and bottom plate portions 30A and 30B closer together without cracking the magnetic flux conductor 26. Any number of secondary bends may be employed to further reduce the air gap 32 and/or increase the thickness of the magnetic flux conductor 26. Further, the embodiments of FIGS. 3A and 3B may employ two magnets similar to the embodiment of FIG. 2C.

Referring again to the disk drive 14 of FIG. 4, the trapezoidal voice coil 42 comprises a first side 46A and a second side 46B. The first side 46A conducts a current to generate at least part of the second magnetic flux 44A for interacting with the first magnetic flux 24 generated by the magnet 22 attached to the magnetic flux conductor 26. The orthogonal relationship between the first and second magnet fluxes creates a torque on the actuator arm 16 so that it rotates about a pivot 48. The direction of rotation depends on the direction of the current flowing through the voice coil 42. The second side 46B of the voice coil 42 returns the current to the first side 46A and generates at least part of the second magnetic flux 44B not substantially interacting with any magnetic flux. The second magnetic flux 44B has a different orientation (i.e., opposite) from the second magnetic flux 44A which is why the second magnet flux 44B does not substantially interact with the first magnet flux 24. Further details of this embodiment are disclosed in the above-referenced patent application entitled "DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX".

Figure 5:
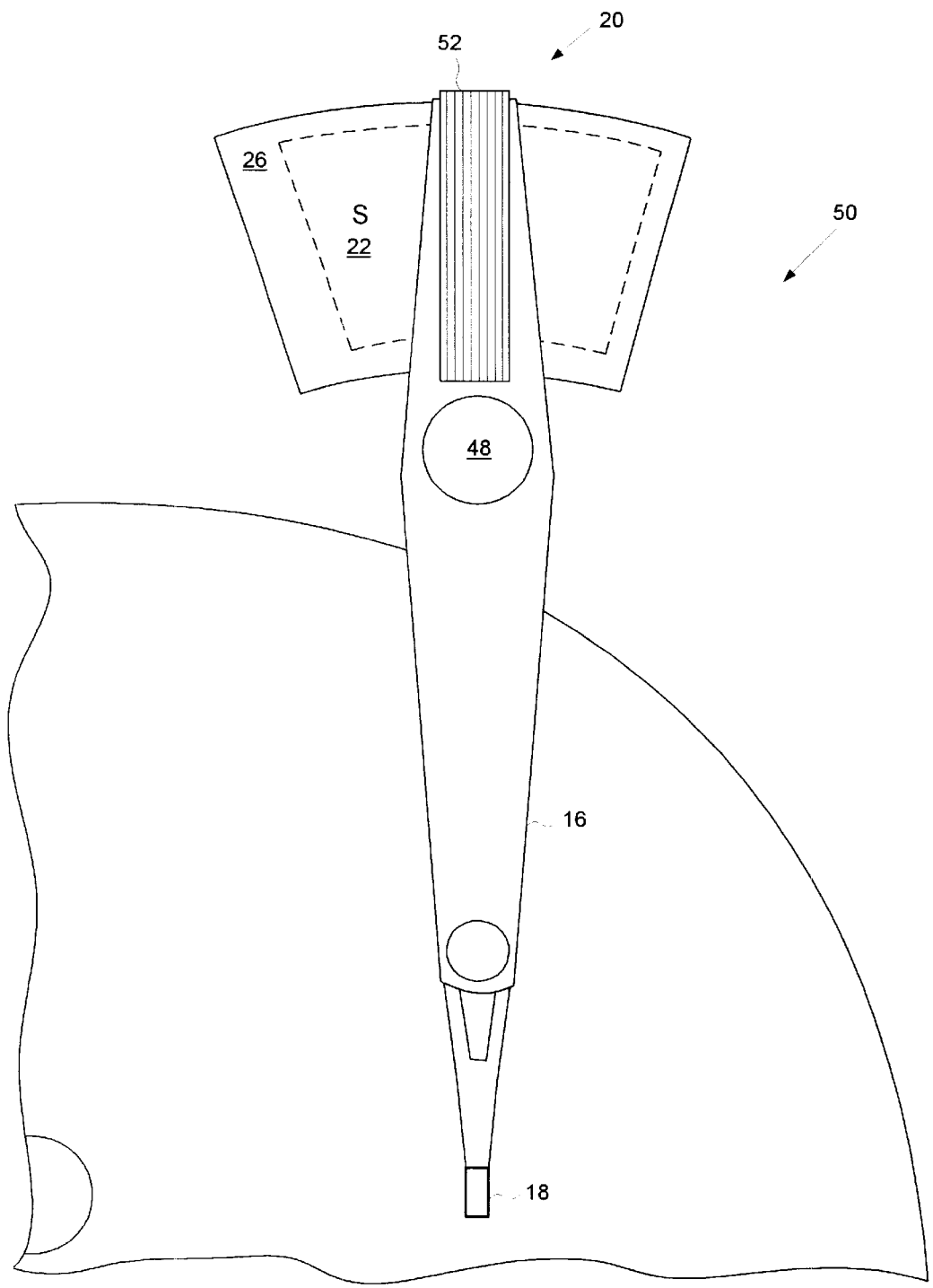
FIG. 5 shows a disk drive according to an alternative embodiment of the present invention wherein the voice coil is wrapped around the top plate portion of the yoke's magnetic flux conductor.

FIG. 5 shows a disk drive 50 according to an alternative embodiment of the present invention. This embodiment employs a "vertical" voice coil 52 which is wrapped around the top plate portion 30A of the magnetic flux conductor 26. The bottom portion of the voice coil 52 is positioned within the air gap 32 of the magnetic flux conductor 26 to generate part of the second magnetic flux which interacts with the first magnetic flux 24, thereby generating the torque which rotates the actuator arm 16 about the pivot 48. The top portion of the voice coil 52 returns the current to the bottom portion, and generates part of the second magnetic flux opposite in orientation from that generated by the bottom portion of the voice coil 52. The magnet 22 is attached to the bottom plate portion 30B of the magnetic flux conductor 26 as shown in FIG. 2B. Further details of this embodiment are disclosed in the above-referenced patent application entitled "VOICE COIL MOTOR COMPRISING A VOICE COIL WRAPPED AROUND A ROTARY VOICE COIL YOKE COMPRISING A LOW RELUCTANCE END AND A HIGH RELUCTANCE END."

We claim:
1. A disk drive comprising:
  (a) an actuator arm;
  (b) a head coupled to the actuator arm; and
  (c) a voice coil motor for actuating the actuator arm to move the head, the voice coil motor comprising:
    a first magnet for generating a first magnetic flux;
    a yoke comprising a magnetic flux conductor for guiding the first magnetic flux, wherein:
      the magnetic flux conductor comprising at least one side portion and a first and second plate portions protruding from the side portion;
      the side portion and the plate portions being integrally formed;
      the first plate portion being spaced-apart from the second plate portion defining a gap between the first plate portion and second plate portion; and
      the side portion comprising a plurality of bends defining an interior bend path along an interior surface of the side portion coincident with the gap, the interior bend path traversing more than 180 degrees; and
    a voice coil for conducting a current to generate a second magnetic flux for interacting at least partially with the first magnetic flux.

2. The disk drive as recited in claim 1, wherein the magnetic flux conductor comprises a substantially U-shape.

3. The disk drive as recited in claim 1, wherein the at least one secondary bend comprises a plurality of contiguous secondary bends.

4. The disk drive as recited in claim 1, wherein the at least one secondary bend comprises a plurality of non-contiguous secondary bends.

5. The disk drive as recited in claim 1, wherein the first magnet is attached to the bottom plate portion.

6. The disk drive as recited in claim 1, wherein the voice coil motor further comprises a second magnet.

7. The disk drive as recited in claim 6, wherein the first magnet is attached to the bottom plate portion and the second magnet is attached to the top plate portion.

8. The disk drive as recited in claim 1, wherein the voice coil is wrapped around the top plate portion.

9. The disk drive as recited in claim 1, wherein the secondary bend radius being greater or equal to the primary bend radius.

10. A disk drive comprising:

(a) an actuator arm;

(b) a head coupled to the actuator arm; and (c) a voice coil motor for actuating the actuator arm to move the head, the voice coil motor comprising:

a first magnet for generating a first magnetic flux;

a yoke comprising a magnetic flux conductor for guiding the first magnetic flux, wherein:

the magnetic flux conductor comprising a body and a top and bottom protruding plate portions;

the body and the plate portions being integrally formed;

each plate portion extending away from the body;

the top plate portion being vertically spaced-apart from the bottom plate portion;

the body defining, in vertical cross section, a primary bend having a primary bend radius and at least one secondary bend having a secondary bend radius; and the secondary bend radius being non-concentric with the primary bend radius; and a voice coil for conducting a current to generate a second magnetic flux for interacting at least partially with the first magnetic flux, wherein:

the voice coil comprises a trapezoidal shape comprising a first side and a second side;

the first side for conducting the current to generate at least part of the second magnetic flux for interacting with the first magnetic flux; and the second side for returning the current to the first side and for generating at least part of the second magnetic flux not substantially interacting with any magnetic flux.

11. A yoke for use in a voice coil motor of a disk drive, the disk drive comprising an actuator arm and a head coupled to the actuator arm, the voice coil motor comprising a first magnet for generating a first magnetic flux, the yoke comprising a magnetic flux conductor for guiding the first magnetic flux, wherein:

(a) the magnetic flux conductor comprising at least one side portion and a first and second plate portions protruding from the side portion;

(b) the side portion and the plate portions being integrally formed;

(c) the first plate portion being vertically spaced-apart from the second plate portion defining a gap between the first plate portion and second plate portion; and (d) the side portion comprising a plurality of bends defining an interior bend path along an interior surface of the side portion coincident with the gap, the interior bend path traversing more than 180 degrees.

12. The yoke as recited in claim 11, wherein the magnetic flux conductor comprises a substantially U-shape.

13. The yoke as recited in claim 11, wherein the at least one secondary bend comprises a plurality of contiguous secondary bends.

14. The yoke as recited in claim 11, wherein the at least one secondary bend comprises a plurality of non-contiguous secondary bends.

15. The yoke as recited in claim 11, wherein the first magnet is attached to the bottom plate portion.

16. The yoke as recited in claim 11, wherein the voice coil motor further comprises a second magnet.

17. The yoke as recited in claim 16, wherein the first magnet is attached to the bottom plate portion and the second magnet is attached to the top plate portion.

18. The yoke as recited in claim 11, wherein the voice coil motor further comprises a voice coil wrapped around the top plate portion.

19. The yoke as recited in claim 11, wherein the secondary bend radius being greater or equal to the primary bend radius.

20. A yoke for use in a voice coil motor of a disk drive, the disk drive comprising an actuator arm and a head coupled to the actuator arm, the voice coil motor comprising a first magnet for generating a first magnetic flux, the yoke comprising a magnetic flux conductor for guiding the first magnetic flux, wherein:

(a) the magnetic flux conductor comprising a body and a top and bottom protruding plate portions;

(b) the body and the plate portions being integrally formed;

(c) each plate portion extending away from the body;

(d) the top plate portion being vertically spaced-apart from the bottom plate portion;

(e) the body defining, in vertical cross section, a primary bend having a primary bend radius and at least one secondary bend having a secondary bend radius;

(f) the secondary bend radius being non-concentric with the primary bend radius;

(g) the voice coil motor further comprises a voice coil having a trapezoidal shape comprising a first side and a second side;

(h) the first side for conducting a current to generate a second magnetic flux for interacting with the first magnetic flux; and (i) the second side for returning the current to the first side and for generating at least part of the second magnetic flux not substantially interacting with any magnetic flux.

* * * * *